(12) United States Patent
Merritt et al.

(10) Patent No.: US 10,105,996 B2
(45) Date of Patent: Oct. 23, 2018

(54) INNER TUBE PROTECTIVE DEVICE

(71) Applicant: RJ Engineering Enterprises Inc., El Dorado Hills, CA (US)

(72) Inventors: David Merritt, El Dorado Hills, CA (US); Jeffery Hodsdon, Roseville, CA (US); Robert Breeding, El Dorado Hills, CA (US)

(73) Assignee: RJ Engineering Enterprises Inc., El Dorado Hills, CA (US)

( * ) Notice: Subject to any disclaimer, the term of this patent is extended or adjusted under 35 U.S.C. 154(b) by 90 days.

(21) Appl. No.: 14/029,362

(22) Filed: Sep. 17, 2013

(65) Prior Publication Data

US 2015/0075690 A1    Mar. 19, 2015

(51) Int. Cl.
*B60C 15/00* (2006.01)
*B60C 19/12* (2006.01)
*B60B 21/12* (2006.01)

(52) U.S. Cl.
CPC ............ *B60C 19/127* (2013.01); *B60B 21/12* (2013.01); *B60B 2360/32* (2013.01); *B60B 2900/212* (2013.01); *Y10T 152/10657* (2015.01)

(58) Field of Classification Search
CPC .......... B60C 15/00; B60C 19/00; B60C 19/12
See application file for complete search history.

(56) References Cited

U.S. PATENT DOCUMENTS

| 5,632,528 | A | * | 5/1997 | Gohrbandt | B60B 25/04 |
| | | | | | 152/381.4 |
| 5,679,184 | A | | 10/1997 | Hosking | |
| 6,186,206 | B1 | | 2/2001 | Yamagiwa et al. | |
| 2008/0149249 | A1 | | 6/2008 | Rahier et al. | |

FOREIGN PATENT DOCUMENTS

| EP | 0603730 | 6/1994 |
| EP | 2173572 | 4/2013 |
| GB | 787784 | * 12/1957 |

\* cited by examiner

*Primary Examiner* — Justin R Fischer

(57) ABSTRACT

Embodiments of the present invention provide a novel solution for preventing pinch flats and installation flats incurred by an inner tube as a result of the wheel striking an object. Embodiments are directed to an inner tube protector that fits within a tire and provides mechanical protection to the inner tube against tire strikes. Embodiments may include an inner region adapted to support an inner tube installed around a rim of a wheel. Additionally, embodiments may include an outer region adapted for insertion within and against the rim lip of the rim which provide protection to the inner tube responsive to the wheel striking an object. As such, embodiments may be positioned between the rim and inner tube in a manner that dulls an edge of the rim lip and, thereby, provides protection to the inner tube when compressed against the otherwise sharp edges of the rim lip.

3 Claims, 14 Drawing Sheets

INNER TUBE PROTECTIVE DEVICE

FIELD OF THE INVENTION

Embodiments of the present invention are generally related to the field of inner tube puncture prevention with respect to a tire.

BACKGROUND OF THE INVENTION

Within the field of cycling, such as off-road motorcycle riding/racing or bicycle riding/racing relating to mountain/road/regular, cyclists often use tires that have inner tubes beneath the casing of their bike tires to assist in maintaining a desirable level of air pressure while cycling. When cycling through certain terrains, cyclists often encounter hazards, such as rocks, which have the potential to cause damage to the inner tube, such as causing pinch flats or "snake bites." For instance, when cycling at high speeds, a bike tire may strike a rock with such force that the casing of the tire pinches the inner tube against the sharp edges of the rim, causing it to puncture with small holes at the point of impact, typically this is considered in the industry to be a pinch flat or snake bite. Furthermore, when changing an inner tube on a dirt bike often times the tools used to remove or install the inner tube will puncture the tube. In addition tires for spoked rims are not manufactured with enough rigidity to protect the inner tube from getting a pinch flat.

Conventional methods of preventing pinch flats often focus on increasing the level of air pressure within the bike tires to make them harder or increasing the thickness of the tire casing. However, when increasing the level of air pressure, cyclists often have difficulty finding a suitable equilibrium point between a comfortable hardness level for the tire and a suitable air pressure level that minimizes the probability of incurring a pinch flat. Highly or over-inflated tire also make certain terrain difficult to maneuver while biking. Furthermore, cyclists may find that increased costs and weight associated with increasing the thickness level of the tire may be too costly and weigh too much to be a viable solution.

SUMMARY OF THE INVENTION

Accordingly, a need exists for a solution that significantly minimizes the occurrence of pinch flats within inner tubes in an efficient and less costly manner. Embodiments of the present invention provide a novel solution for preventing pinch flats or "snake bites" as well as installation flats (e.g., flats caused by installation tools) incurred by an inner tube as a result of the wheel striking an object. Embodiments of the present invention are directed to an inner tube protector that fits within a tire and provides mechanical protection to the inner tube against tire strikes. Embodiments of the present invention include an inner region adapted to support an inner tube installed around a rim of a spoked wheel. Additionally, embodiments of the present invention include an outer region adapted for insertion within and against the rim lip of the rim which extends radially outward to provide protection to the inner tube responsive to the wheel striking an object. As such, embodiments of the present invention may be positioned between the rim and inner tube in a manner that dulls an edge of the rim lip and, thereby, provides protection to the inner tube when compressed against the otherwise sharp edges of the rim lip. Furthermore, embodiments of the present invention can be enclosed within an installed tire on the spoked wheel.

More specifically, embodiments of the present invention are implemented as an inner tube protector. The inner tube protector includes a generally circular flat member that includes an inner region adapted to support an inner tube installed around a rim of a bicycle wheel. Also, the generally circular flat member includes an outer region adapted for insertion within and against a rim lip of the rim, in which the outer region is adapted to extend radially outward to provide protection to the inner tube responsive to the wheel striking an object, the outer region is adapted to be positioned between the rim and the inner tube to dull an otherwise sharp edge of the rim lip and further adapted to be enclosed within an installed tire on the wheel.

In one embodiment, the outer region protects the inner tube against punctures. In one embodiment, the punctures are associated with pinch flats. In one embodiment, the generally circular member is split to facilitate installation between the rim and the inner tube. In one embodiment, the flat member includes a splice point that is operable to accommodate a tire lock installed on the wheel. In one embodiment, the generally circular flat member includes a flexible and resilient resin material. In one embodiment, the generally circular flat member is slightly curved in cross section.

In one embodiment, the inner tube and the generally circular flat member are integrated together. In one embodiment, the tire and the generally circular flat member are integrated together. In one embodiment, the rim and the generally circular flat member are integrated together.

In one embodiment, the present invention is implemented as a rim for protecting an inner tube. The rim includes a channel region circumferentially located along an exterior portion of the rim, in which the channel region is adapted for mounting a spoked wheel. The rim also includes a generally circular flat member integrated into an outer periphery of a rim lip of the rim in which the flat member includes an inner region adapted to support an inner tube installed within the channel region and an outer region adapted to extend radially outward from the rim to provide protection to the inner tube responsive to the wheel striking an object, the outer region adapted to be positioned between the rim lip and the inner tube to dull an edge of the rim lip and further adapted to be enclosed within an installed tire on the wheel.

In one embodiment, the outer region protects the inner tube against pinch flats. In one embodiment, the generally circular flat member comprises a flexible and resilient resin material. In one embodiment, the generally circular flat member is slightly curved in cross section. In one embodiment, the rim further includes a plurality of spokes. In one embodiment, the rim is further operable to accommodate an installable rim guard.

In one embodiment, the present invention is implemented as a tire for protecting an inner tube. The tire includes a tread portion circumferentially located about an axis of the tire. Also, the tire includes a tire bead, in which the tire bead is coupled to the tread portion by a sidewall and adapted to connect a rim on a wheel. The tire also includes a generally circular flat member integrated into the sidewall and adjacent to the tire bead which includes an inner region adapted to support an inner tube installed within the sidewall and an outer region adapted to extend radially outward from the tire bead to provide protection to the inner tube responsive to the wheel striking an object, the outer region adapted to be positioned between a rim lip of the rim and the inner tube to dull an edge of the rim lip.

In one embodiment, the outer region protects the inner tube against pinch flats. In one embodiment, the generally circular flat member comprises a flexible and resilient resin material. In one embodiment, the generally circular flat member is slightly curved in cross section.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details.

Embodiments of the present invention include a protector element that may be adapted to fit a tire assembly profile associated with conventional motorized bicycles (e.g., motorcycles, dirt bikes, etc.) as well as conventional non-motorized bicycles (e.g., road bicycles, mountain bicycles, etc.) in which usage of an inner tube may be desirable. Additionally, embodiments of the present invention include a protector element that may be adapted to fit a particular front tire and/or rear tire assembly profile.

Figure 1A:
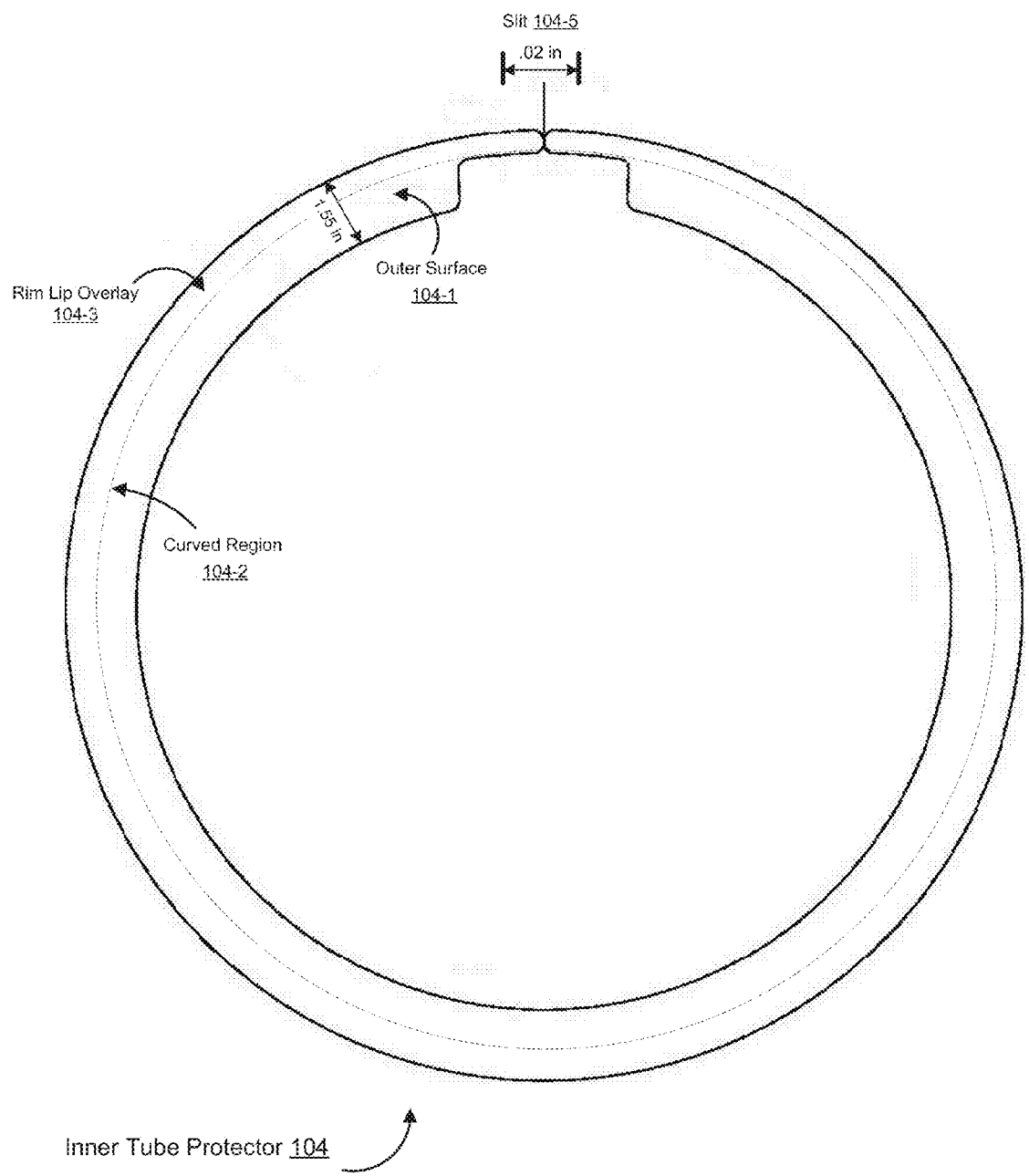
FIG. 1A depicts an exemplary inner tube protector in accordance with embodiments of the present invention.

For example, FIG. 1A depicts an exemplary inner tube protector element (e.g., inner tube protector 104), along with exemplary dimensions, that may be adapted for protecting an inner tube installed within a front tire assembly profile (e.g., 18 inch tire) in accordance with embodiments of the present invention. Inner tube protector 104 may be of such resilient composition and dimensions that it may be capable of protecting an inner tube against pinch flats that occur due to the sharp edges of a rim lip puncturing the inner tube upon a tire strike while providing the inner tube sufficient support. In one embodiment, materials used to produce inner tube protector 104 may include, but are not limited to, high density polyethylene (HDPE), plastic or polymer material, metal or alloy material, wood, composite material, foam, rubber, fabric, fiberglass, Kevlar®, carbon fiber or any other rigid material, as well as any combination thereof.

As illustrated in FIG. 1A, inner tube protector 104 may be a generally circular or coil-like structure configured to be placed between the rim and inner tube of a tire assembly. Inner tube protector 104 may include an outer surface (e.g., outer surface 104-1) adapted for insertion within and against a rim lip. When setting inner tube protector 104 along the base or channel region of the rim, the base of inner tube protector 104 may extend in a radially outward direction towards curved region 104-2, which may curve outer surface 104-1 in a direction facing towards the rim lip. As such, rim lip overlay 104-3 may act as a protective barrier that protects against punctures caused by the sharp edges of the rim lip against the inner tube during a tire strike.

Embodiments of the present invention may also be adapted to facilitate both an expedient installation and removal process from within a tire assembly. For example, with further reference to the embodiment depicted in FIG. 1A, inner tube protector 104 may include an incision or split (e.g., split 104-5) across the surface of inner tube protector 104. As such, inner tube protector 104 may be easily positioned along the base of the rim in a manner that allows rim lip overlay 104-3 to protect tire assembly components installed along the base of the rim and within the rim lip.

Figure 1B:
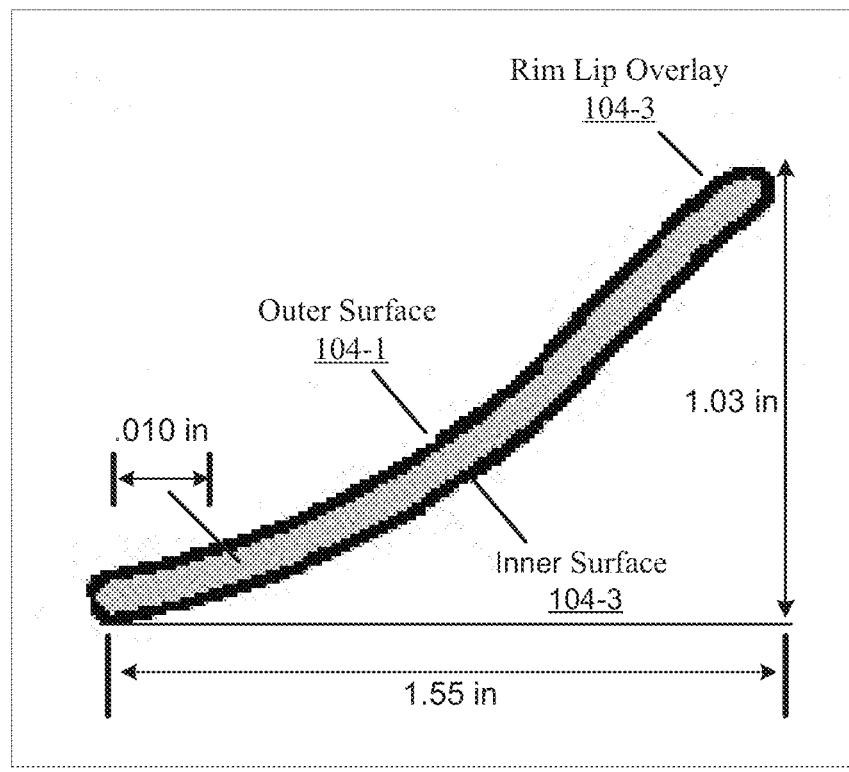
FIG. 1B depicts an exemplary curved cross section within an exemplary inner tube protector in accordance with embodiments of the present invention.

FIG. 1B depicts an exemplary curved region or cross section associated with curved region 104-2 in accordance with embodiments of the present invention. As illustrated in FIG. 1B, curved region 104-2 may include curved cross-sections along a portion of inner tube protector 104 that may securely fit outer surface 104-1 along the contour of the rim lip. In one embodiment, the curved cross-sections of inner tube protector 104 may also enable outer surface 104-1 to be securely fitted against the contour of the inner sidewalls of a tire. As such, a portion of outer surface 104-1 (e.g., rim lip overlay 104-3) may be extended in a radially outward manner that extends over and beyond the rim lip. In this manner, an inner surface (e.g., inner surface 104-3) of inner tube protector 104 may buttress tire assembly components installed along the base of the rim and alongside inner tube protector 104. For instance, in one embodiment, the curved nature of curved region 104-2 may enable portions of inner surface 104-3 to fit along the contour of the outer sidewalls of an inner tube positioned within the rim lip in a manner that supports the inner tube during operation of the tire assembly. Similarly, in one embodiment, the curved cross-sections of inner tube protector 104 may enable portions of inner surface 104-3 to be securely fitted against the contour of the outer sidewalls of a tire (or any other tubular device) positioned within the rim lip, thus positioning inner tube protector 104 in a manner that supports the tire during operation of the tire assembly.

Accordingly, when setting tire assembly components along the base of the rim within the inner surface 104-3 of inner tube protector 104 in the manner described supra, rim lip overlay 104-3 may act as a protective barrier that protects against punctures caused by the rim lip during a tire strike. For instance, when positioning an inner tube against inner surface 104-3 along the base of the rim, rim lip overlay 104-3 may act as a protective barrier that can dull the otherwise sharp edges of the rim lip upon contact in a tire strike. In one embodiment, inner tube protector 104 may positioned in between the outer sidewalls of a tire and the rim lip in a manner that similarly allows rim lip overlay 104-3 to protect the tire, along with any other components installed within the encasing of the tire, against punctures that may be incurred due to the sharp edges of the rim lip.

Figure 2:
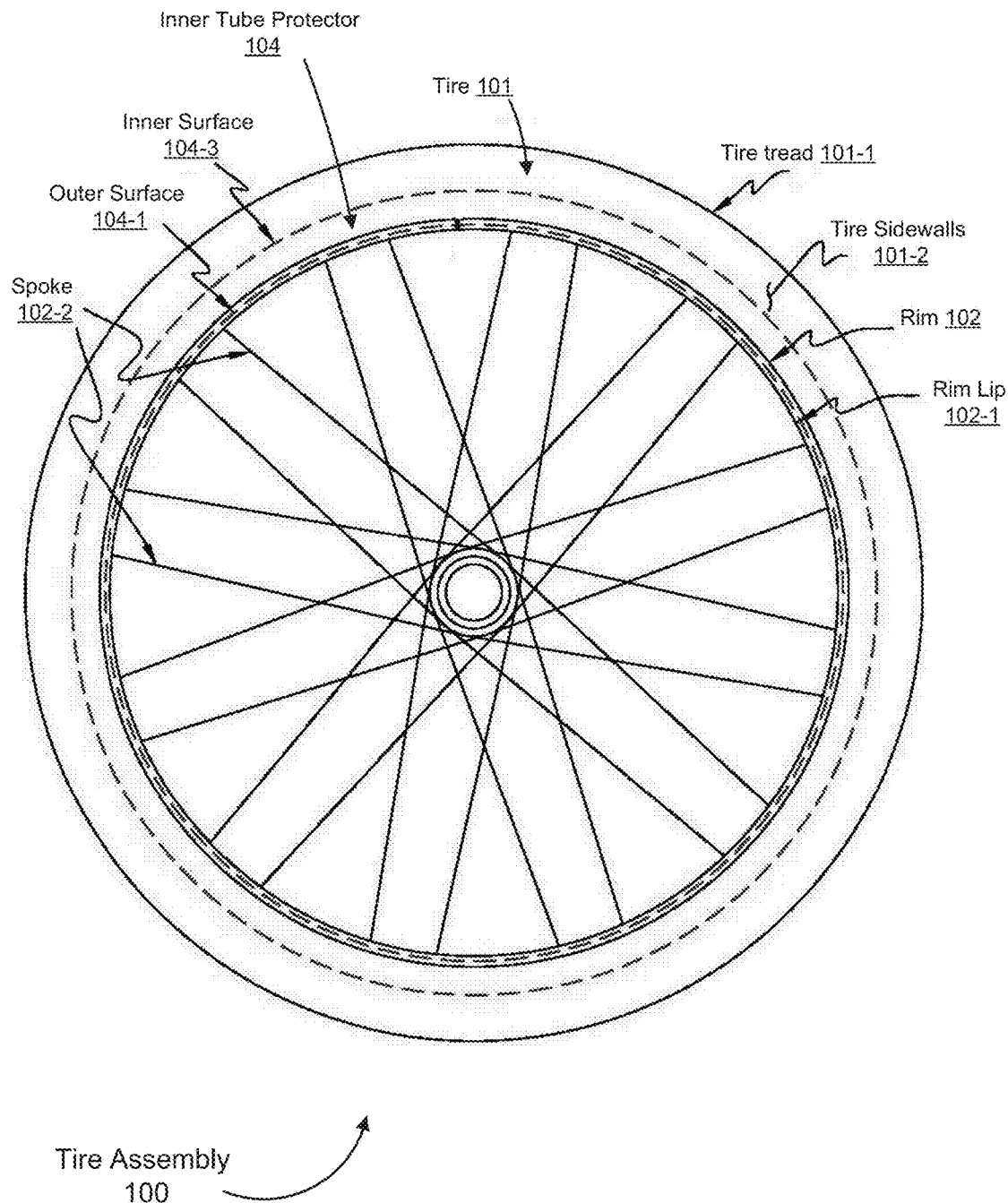
FIG. 2 is a side view of an exemplary tire assembly profile that includes an exemplary inner tube protector in accordance with embodiments of the present invention.

FIG. 2 is a side view of an exemplary tire assembly profile (e.g., front tire, back tire, etc.) encasing an exemplary inner tube protector (e.g., inner tube 104) installed within the assembly in accordance with embodiments of the present invention. As illustrated in FIG. 2, tire assembly 100 may include tire 101, rim 102, (including rim lip 102-1), as well as inner tube protector 104 (including inner surface 104-3 and outer surface 104-1). Tire 101 may include tire tread 101-1 for use in making contact with a surface (e.g., road surface) and tire sidewalls 101-2 which extend radially inward towards rim 102. Rim 102 may also include a plurality of spokes (e.g., spoke 102-2) extending radially outward from a connection point used to connect a hub (not pictured) and an axel (not pictured).

Figure 3:
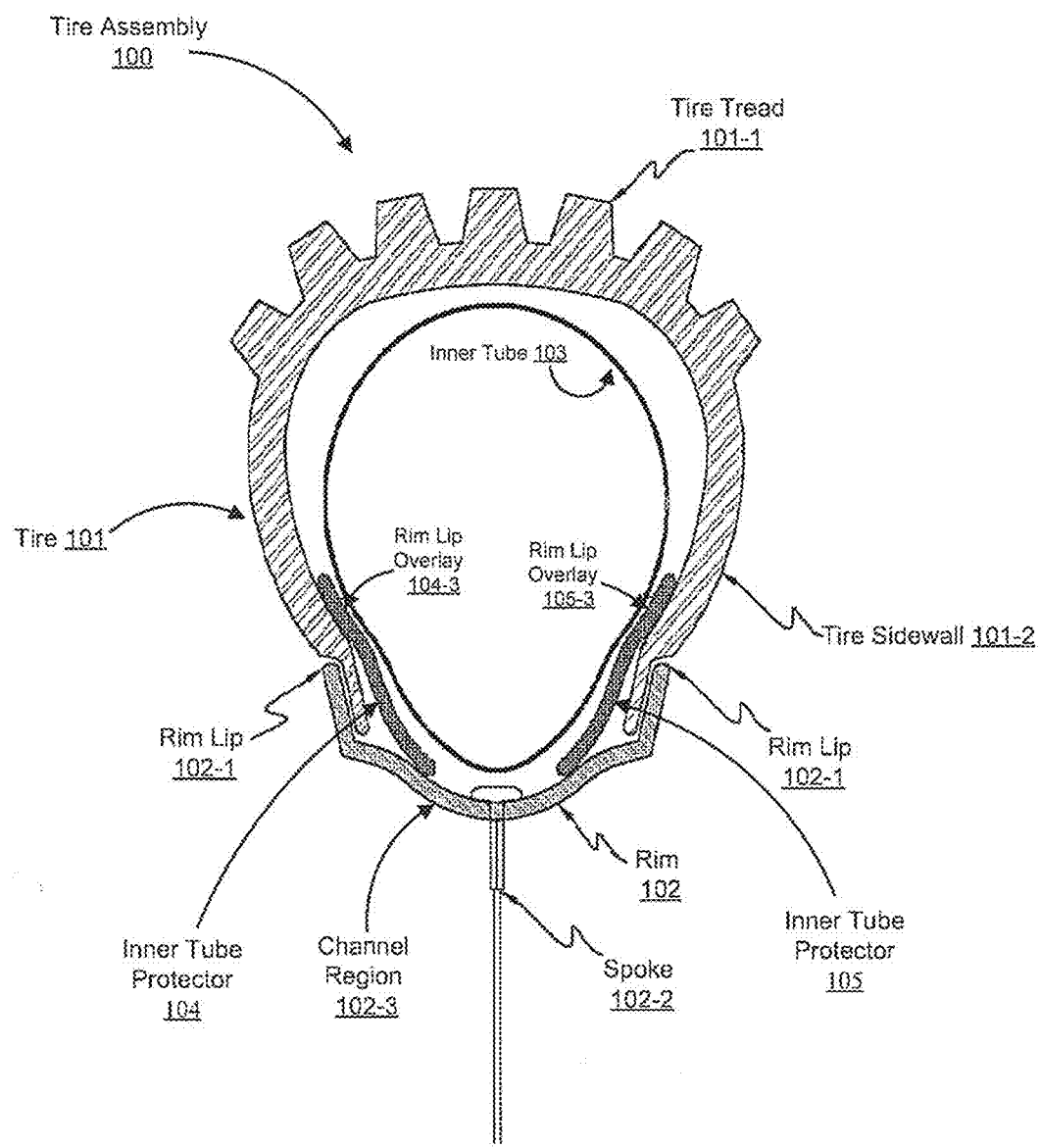
FIG. 3 is a cross section view of an exemplary tire assembly profile that includes a pair of inner tube protectors installed to protect an inner tube mounted along the rim of the assembly in accordance with embodiments of the present invention.

FIG. 3 is a cross section view of an exemplary tire assembly profile along the cut direction of FIG. 2 that includes a pair of inner tube protectors installed to protect an inner tube mounted along the rim of the assembly in accordance with embodiments of the present invention. As illustrated in FIG. 3, rim 102 may also include a base or channel region (e.g., channel region 102-3) located along an outer portion of rim 102 upon which components of tire assembly 100 may be mounted. For instance, rim 102 may include flanges or rim lips (e.g., rim lip 102-1) located along the top portion of channel region 102-3 (e.g., bead stop) which may be used to retain tire beads associated with tire 101. As such, tire 101 and/or inner tube 103 may be fitted along external ridges leading up the rim lips of rim 102 in a manner that allows air pressure within tire 101 and/or inner tube 103 to remain tightly sealed and securely fixed to rim 102 during operation of tire assembly 100.

With further reference to the embodiment depicted in FIG. 3, separate inner tube protectors 104 and 105 may be placed within the channel region 102-3 of rim 102. As such, inner tube protectors 104 and 105 may include curved regions or cross sections that extend radially outward towards rim lip 102-1 in a manner that positions their respective rim lip overlays (e.g., rim lip overlay 104-3, rim lip overlay 105-3) against the inner sidewalls of tire 101 and over rim lip 102-1. As such, rim lip overlays 104-3 and 105-3 may be in position to dull the sharp edges of rim lip 102-1 in the event of that tire 101 strikes an object. For instance, if an object (e.g., rock) were to strike a portion of tire 101 (e.g., tire tread 101-1) with a high degree of force, rim lip overlays 104-3 and 105-3 may be in position to dull any contact made with the sharp edges of rim lip 102-1 in a manner that lowers the probability of inner tube 103 receiving damage due to pinch flats or "snake bites."

Although the embodiment depicted in in FIG. 3 depicts inner tube protectors 104 and 105 being placed in positions to protect inner tube 103, embodiments of the present invention are not limited to such configurations. According to one embodiment, inner tube protectors 104 and 105 may be placed within the channel region 102-3 in a manner that protects other tire assembly components (e.g., tire 101) from receiving damage caused by rim lip 102-1. For instance, according to one embodiment, inner tube protectors 104 and 105 may be placed within channel region 102-3 in a manner that positions their respective rim lip overlays directly against rim lip 102-1, instead of along the inner sidewalls of tire 101. As such, rim lip overlays 104-3 and 105-3 may be in position to dull the sharp edges of rim lip 102-1 to protect tire 101 (including objects encased within tire 101) in the event of that tire assembly 100 strikes an object.

Figure 4A:
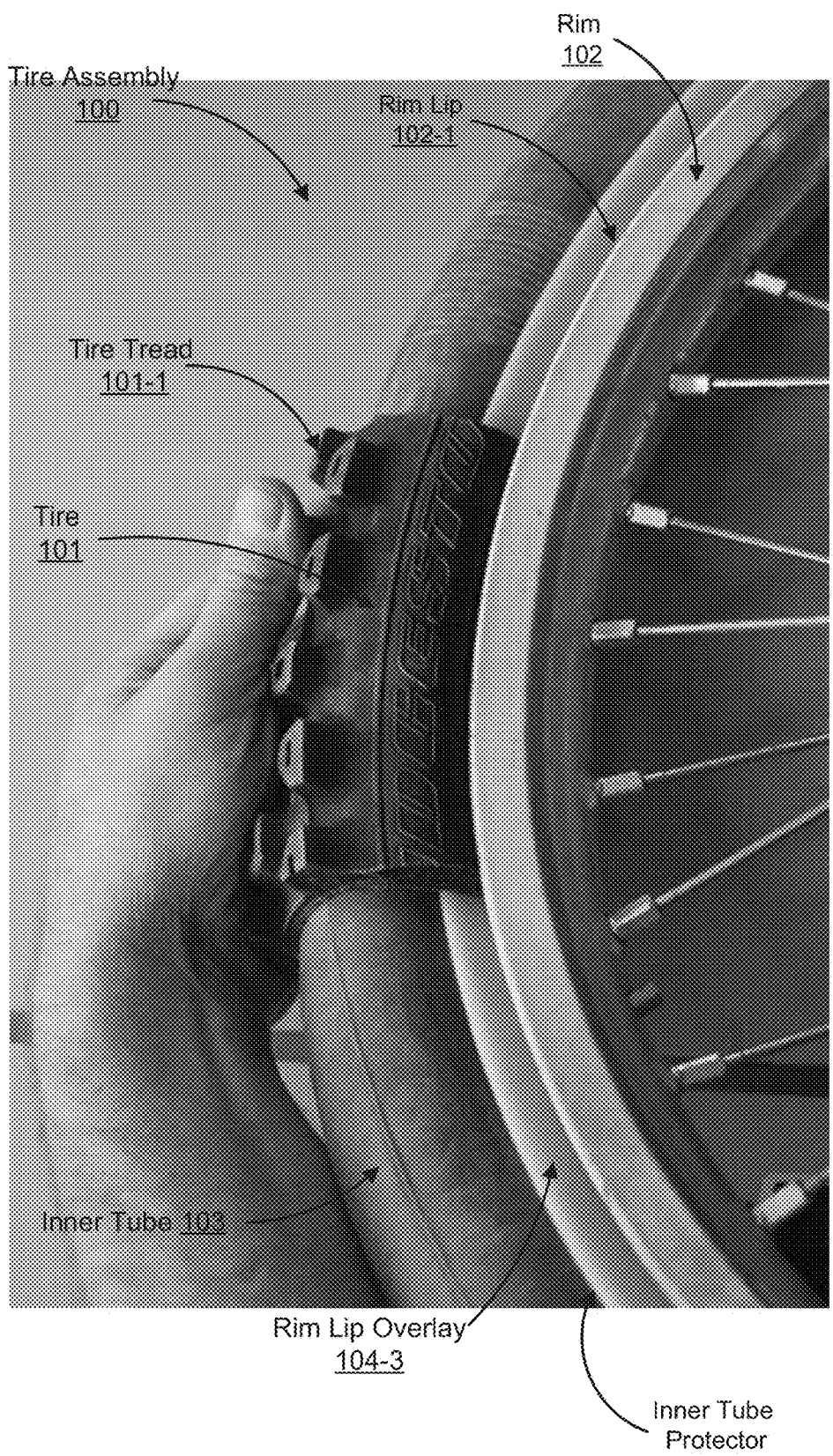
FIG. 4A depicts a perspective view of an exemplary tire assembly incorporating an inner tube protector in accordance with embodiments of the present invention.
Figure 4B:
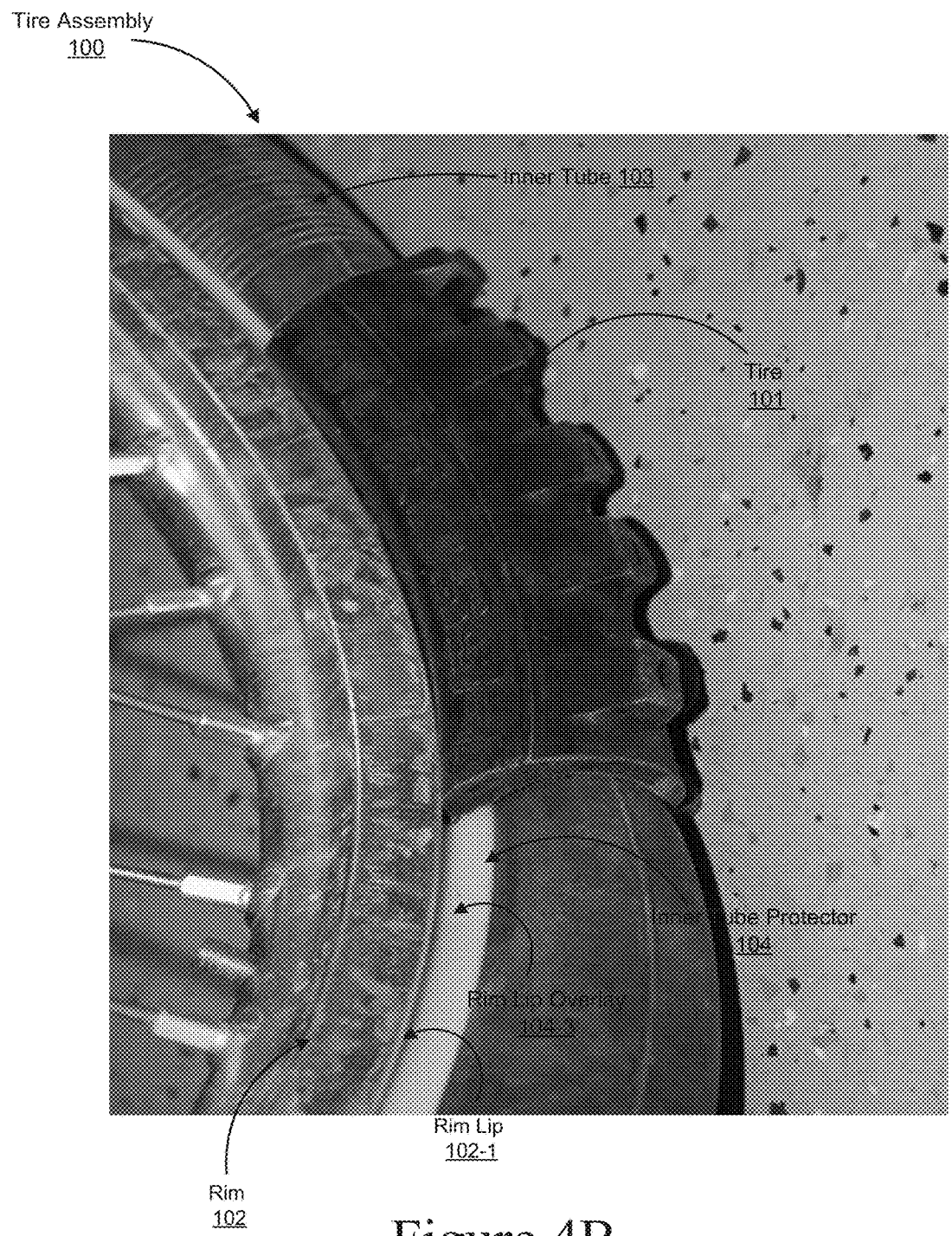
FIG. 4B depicts another perspective view of an exemplary tire assembly incorporating an inner tube protector in accordance with embodiments of the present invention.

FIGS. 4A and 4B depict a perspective view of an exemplary tire assembly (e.g., tire assembly 100) incorporating an inner tube protector (e.g., inner tube protector 104) in accordance with embodiments of the present invention. As illustrated in FIG. 4A, inner tube protector 104 may be encased by tire 101, where it may then be positioned against the sidewalls of tire 101 and inner tube 103 in a manner that places rim lip overlay 104-3 over rim lip 102-1. As such, rim lip overlay 104-3 may be in position to dull the otherwise sharp edges of rim lip 102-1 in the event of that tire 101 strikes an object. For instance, with reference to FIG. 4B, if an object (e.g., rock) were to strike a portion of tire 101 (e.g., tire tread 101-1) with a high degree of force, rim lip overlay 104-3 may be in position to dull any contact made with the sharp edges of rim lip 102-1 in a manner that lowers the probability of inner tube 103 receiving damage due to pinch flats.

Furthermore, it should be appreciated that the ability of rim lip overlay 104-3 to dull the sharp edges of rim lip 102-1 may be virtually unaffected by the air pressure levels maintained by tire 101 and/or inner tube 103. As such, vehicle operators employing inner tube protector 104 within their respective tire assemblies may be able to set desirable air pressure levels within tire 101 and/or inner tube 103 with minimal concern for incurring pinch flats or "snake bites" during vehicle operation. Also, the ability of rim lip overlay 104-3 to dull the sharp edges of rim lip 102-1 may be virtually unaffected by the thickness levels of tire 101 and/or inner tube 103. As such, vehicle operators employing inner tube protector 104 within their respective tire assemblies may be able to utilize tires and/or inner tubes that contain substances of varying degrees of thickness with minimal concern for incurring pinch flats during vehicle operation.

Figure 4C:
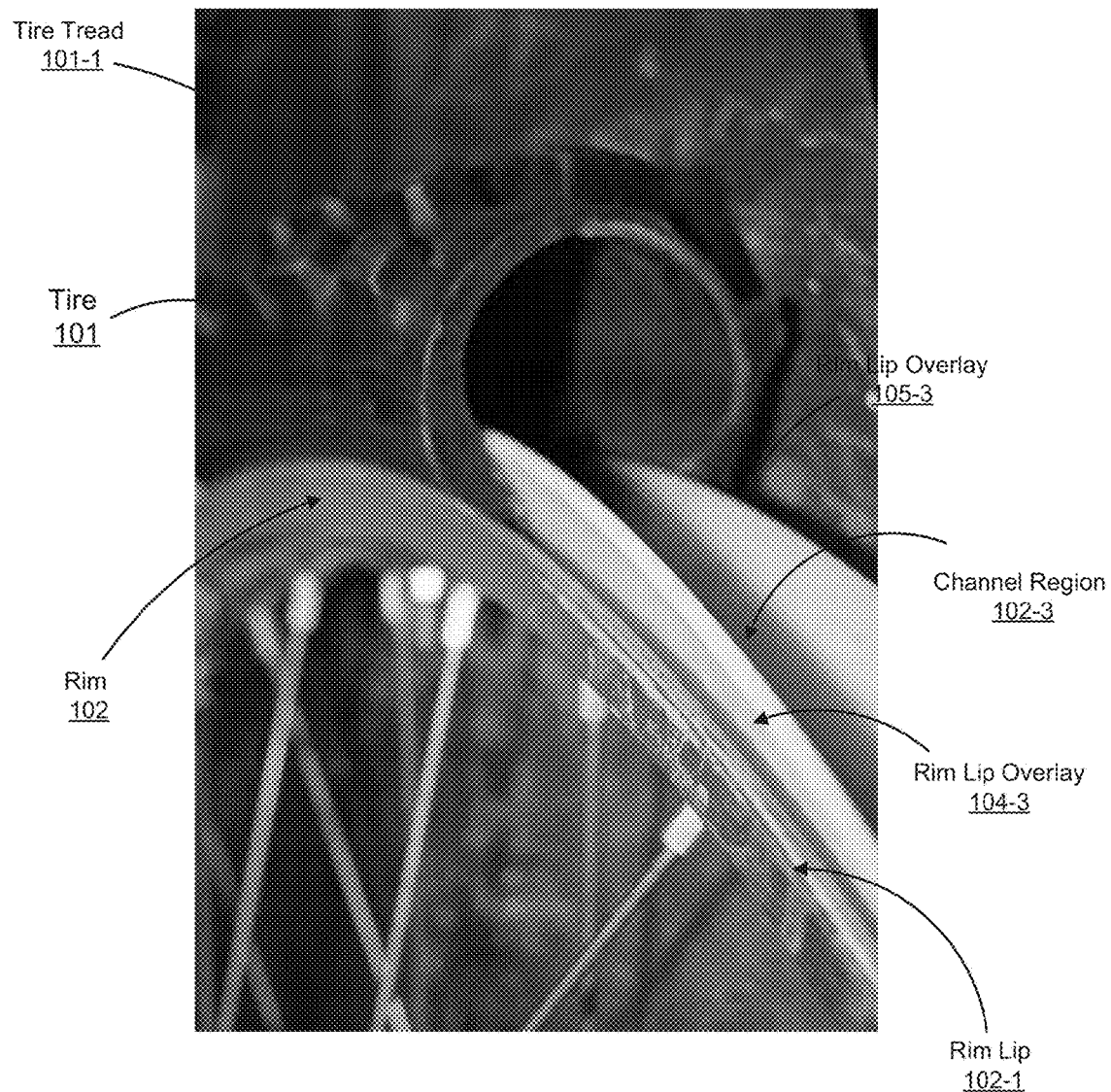
FIG. 4C is another cross section view of an exemplary tire assembly profile that includes a pair of inner tube protectors installed to protect an inner tube to be mounted along the rim of the assembly in accordance with embodiments of the present invention.
Figure 4D:
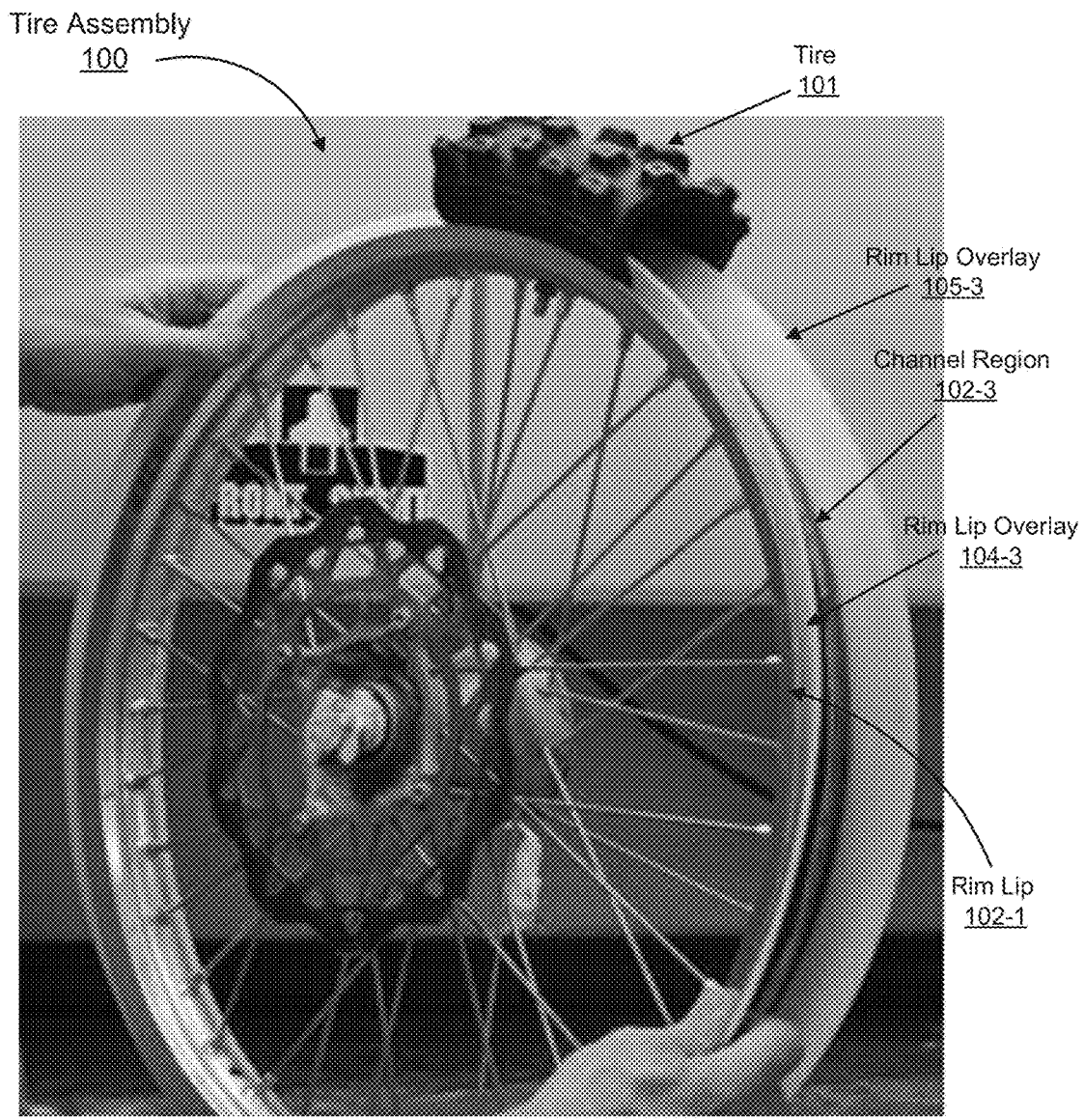
FIG. 4D is yet another cross section view of an exemplary tire assembly profile that includes a pair of inner tube protectors installed to protect an inner tube to be mounted along the rim of the assembly in accordance with embodiments of the present invention.

FIGS. 4C and 4D depict additional cross section views of an exemplary tire assembly profile (e.g., tire assembly 100) that includes a pair of inner tube protectors (e.g., inner tube protectors 104 and 105) installed to protect an inner tube to be mounted along the rim of the assembly in accordance with embodiments of the present invention. As illustrated in FIG. 4C, rim 102 may also include channel region 102-3, located along an outer portion of rim 102 upon which components of tire assembly 100 may be mounted. As such, separate inner tube protectors (e.g., inner tube protectors 104 and 105) may be placed within the channel region 102-3 of rim 102 in a manner such that their respective rim lip overlays (e.g., rim lip overlay 104-3, rim lip overlay 105-3) are placed against the inner sidewalls of tire 101 and over rim lip 102-1. As illustrated in FIG. 4D, rim lip overlays 104-3 and 105-3 may be in position to dull the sharp edges of rim lip 102-1 in the event of that tire 101 strikes an object. Although FIGS. 4C and 4D depict tire assemblies that include spokes (e.g., spoke 102-2), embodiments of the present invention are not limited to such, and may be implemented within rims that do not include spokes.

Figure 5:
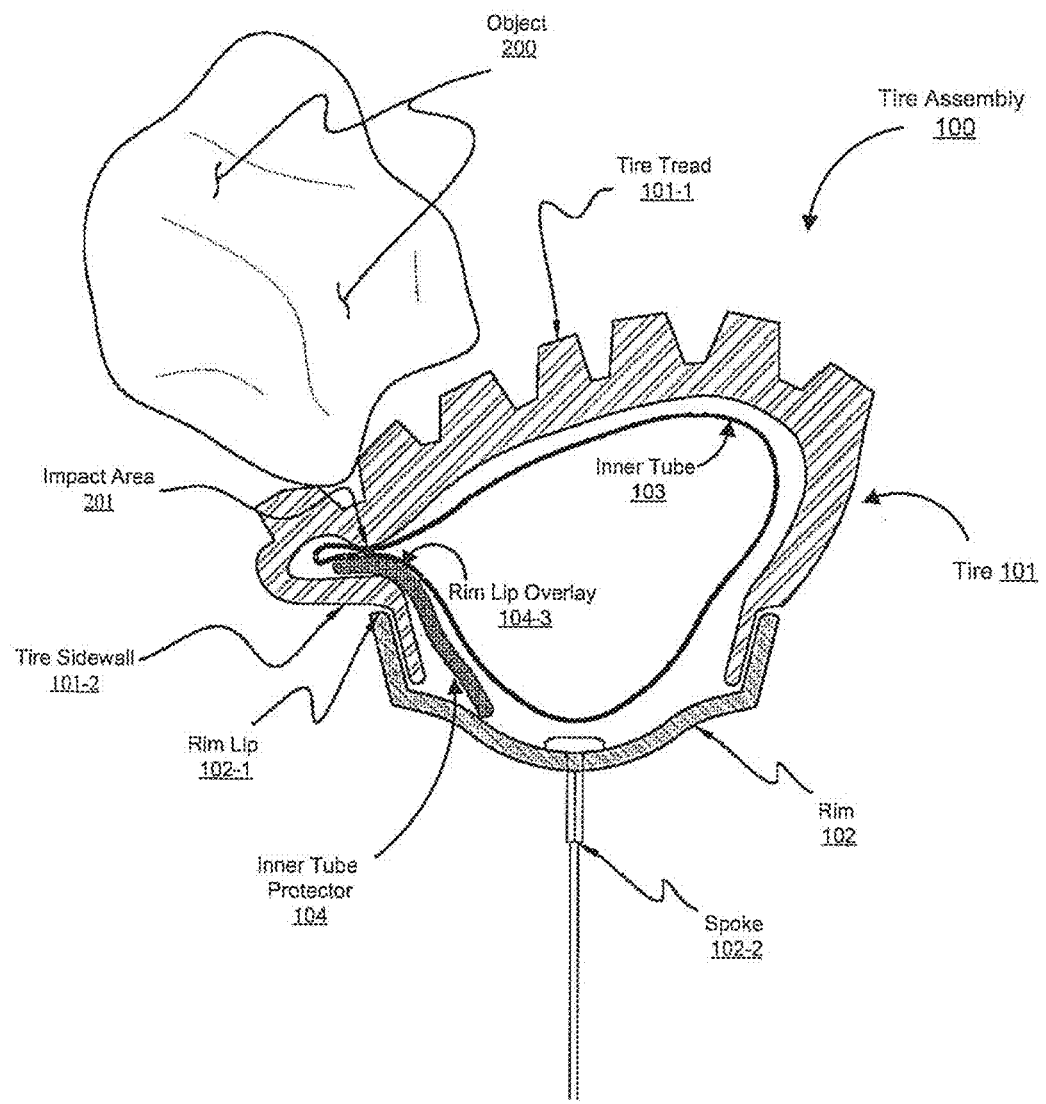
FIG. 5 depicts an exemplary use case of an inner tube protector during operation of a tire assembly in accordance with embodiments of the present invention.

FIG. 5 depicts an exemplary use case during a tire strike of an inner tube protector (e.g., inner tube protector 104) during operation of a tire assembly in accordance with embodiments of the present invention. Object 200 (e.g., rock or other hard object) may impact tire tread 101-1 with such a high degree of force that it has the potential to cause rim lip 102-1 to generate a pinch flat within inner tube 103. As such, impact area 201 may be a region within tire 101 in which the residual force caused by the impact of object 200 upon tire tread 101-1 results in portions of tire sidewall 101-2 and inner tube 103 to converge towards rim lip 102-1. However, as illustrated in FIG. 5, inner tube 103 may suffer no damage as a result of the impact. As illustrated in FIG. 5, the position of rim lip overlay 104-3 with respect to rim lip 102-1 may enable inner tube protector 104 to dull any contact made by the sharp edges of rim lip 102-1 with tire 101 and thereby protect the inner tube. As such, inner tube protector 104 may help lower the possibility of inner tube 103 receiving a puncture as a result of object 200 striking tire 101.

Figure 6:
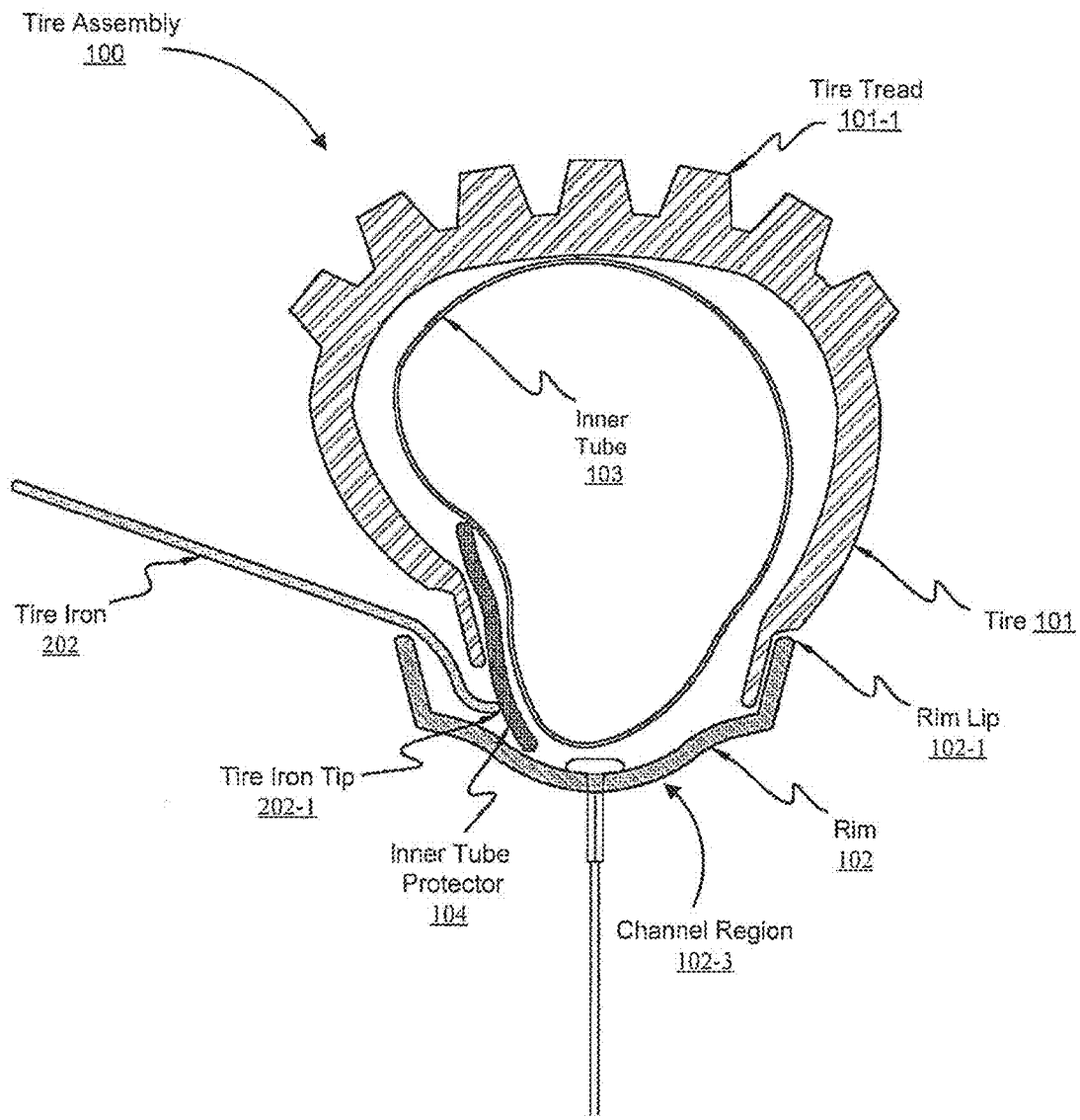
FIG. 6 depicts an exemplary use case of an inner tube protector during tire assembly installation/removal procedures in accordance with embodiments of the present invention.

FIG. 6 depicts another exemplary use case of an inner tube protector in accordance with embodiments of the present invention. FIG. 6 depicts a scenario in which an installed inner tube protector (e.g., inner tube protector 104) may protect against hazards incurred during a removal and/or installation process of components associated with tire assembly 100. Tire iron 202 may be a heavy-duty tool with sharp edges (e.g., tire iron tip 202-1) that can be used to remove and/or install components associated with tire assembly 100 (e.g., tire 101). For instance, during a removal and/or installation process, various degrees of force may be applied via tire iron 202 to manipulate components associated with tire assembly 100 in order to better facilitate the removal and/or installation of a specific component.

As such, a high degree of force may be inadvertently applied upon tire iron 202 that can possibly puncture inner tube 103 during such manipulations. However, as illustrated in FIG. 6, the placement of installed inner tube protector 104 within channel region 102-3 may enable it to dull the sharp edges of tire iron tip 202-1 and prevent inadvertent contact made by tire iron 202 with inner tube 103 during the removal and/or installation process. The positioning of the base of the installed inner tube protector 104 along channel region 102-3 may enable inner tube protector 104 to protect inner tube 103 and help lower the possibility of inner tube 103 receiving puncture damage during removal and/or installation procedures.

Figure 7:
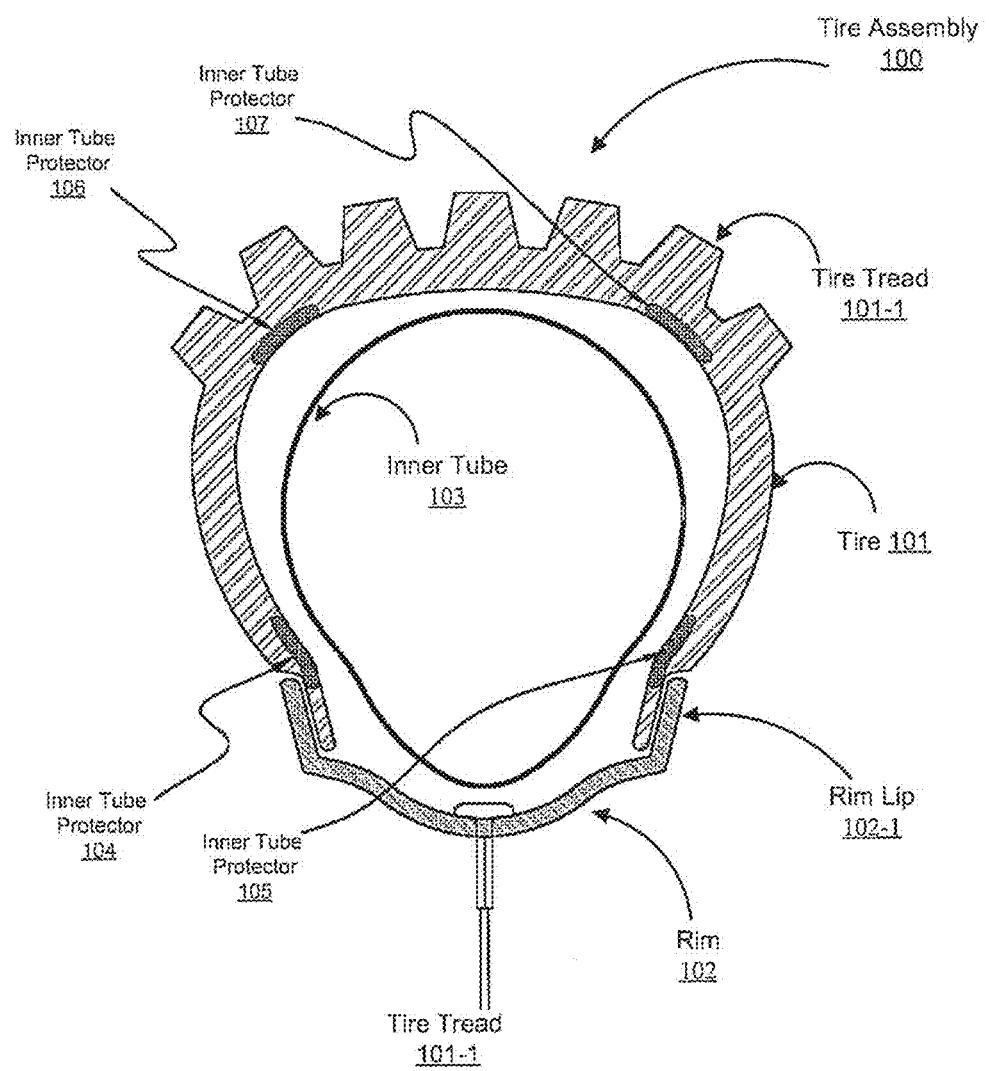
FIG. 7 depicts an exemplary inner tube protector integrated within a tire during manufacture of the tire in accordance with embodiments of the present invention.

Furthermore, embodiments of the present invention may be integrated within the components of a tire assembly during their respective manufacture. For example, with reference to FIG. 7, according to one embodiment, during the manufacture of a tire (e.g., tire 101), inner tube protectors 104, 105, 106 and 107 may be scaled and integrated within a pre-determined, fixed location within the tire so as to maximize their respective protective capabilities. For instance, in one embodiment, inner tube protectors 104 and 105 may be scaled and integrated, during manufacture of the tire, into a location proximate to the tire bead. As such, an inner surface of integrated inner tube protectors 104 and 105 may be configured to support an inner tube installed within the tire, while their respective outer surfaces may be configured to be placed between an estimated location of where the rim lip may be located and where the inner tube may be placed within the tire sidewalls. Furthermore, in one embodiment, inner tube protectors 106 and 107 may be scaled and integrated, during manufacture of the tire, into a location proximate to the tire tread so as to provide further support to an installed inner tube.

Figure 8:
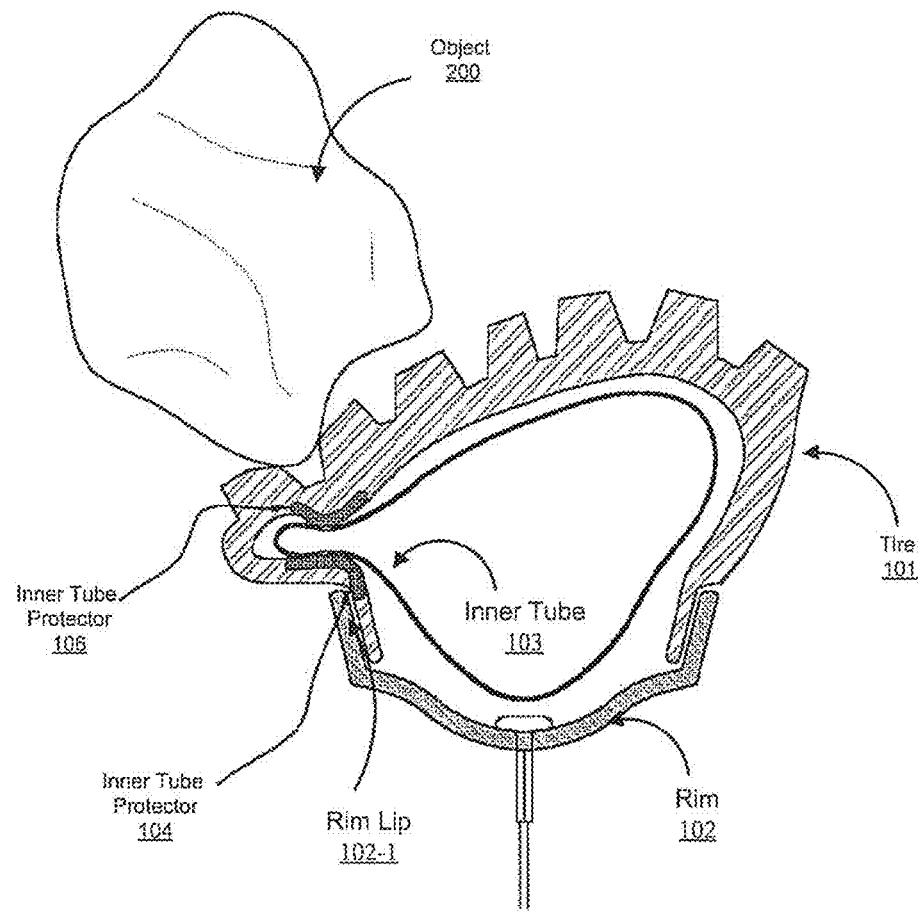
FIG. 8 depicts an exemplary use case of an inner tube protector integrated within a tire in accordance with embodiments of the present invention.

For instance, with reference to the embodiment depicted FIG. 8, object 200 (e.g., rock or other hard object) may impact tire 101 with such a high degree of force that it has the potential to cause rim lip 102-1 to generate a pinch flat within inner tube 103. However, as illustrated in FIG. 8, inner tube 103 may suffer no damage as a result of the impact. As illustrated in FIG. 8, the position of inner tube protectors 104 and 106 with respect to rim lip 102-1 may enable them to further dull any contact made by the sharp edges of rim lip 102-1 with tire 101 and thereby protect inner tube 103. As such, inner tube protectors 104 and 106 may help lower the possibility of inner tube 103 receiving a puncture as a result of object 200 striking tire 101.

Figure 9:
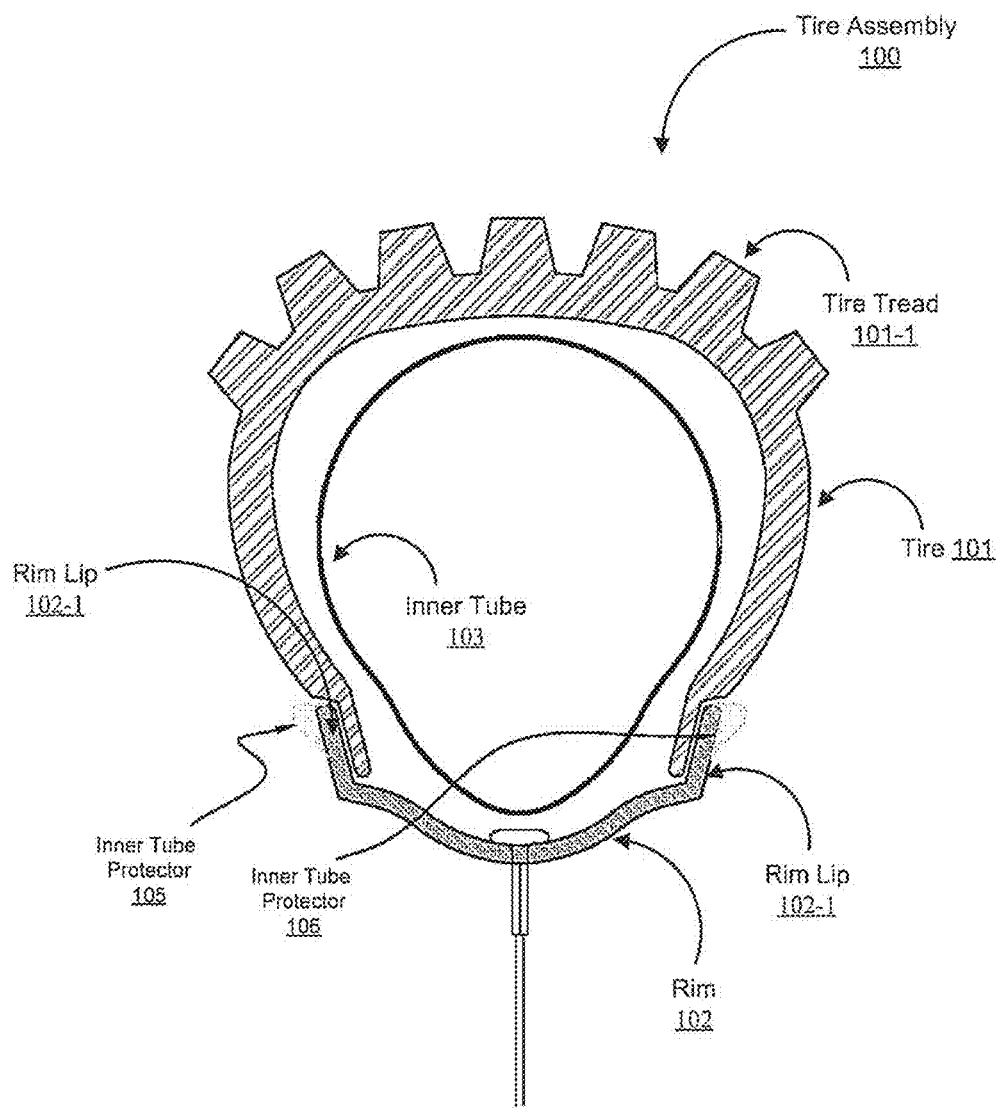
FIG. 9 depicts an exemplary inner tube protector integrated within a rim during manufacture of the rim in accordance with embodiments of the present invention.

Also, with reference to FIG. 9, according to one embodiment, during the manufacture of a rim (e.g., rim 102), inner tube protectors 105 and 106 may be scaled and integrated within a pre-determined, fixed location within the rim (e.g., adjacent to the rim lip) so as to maximize their respective protective capabilities during operation of a tire assembly utilizing the rim. For instance, in one embodiment, inner tube protectors 105 and 106 may be scaled and integrated, during manufacture of rim 102, into a location within the outer periphery of rim lip 102-1. As such, an inner surface of an integrated inner tube protectors 105 and 106 may be configured to support inner tube 103 installed within the channel region of the rim, while their respective outer surfaces may be configured to be placed between the rim lip and an estimated location of where an inner tube may be placed within the channel region of the rim.

Figure 10:
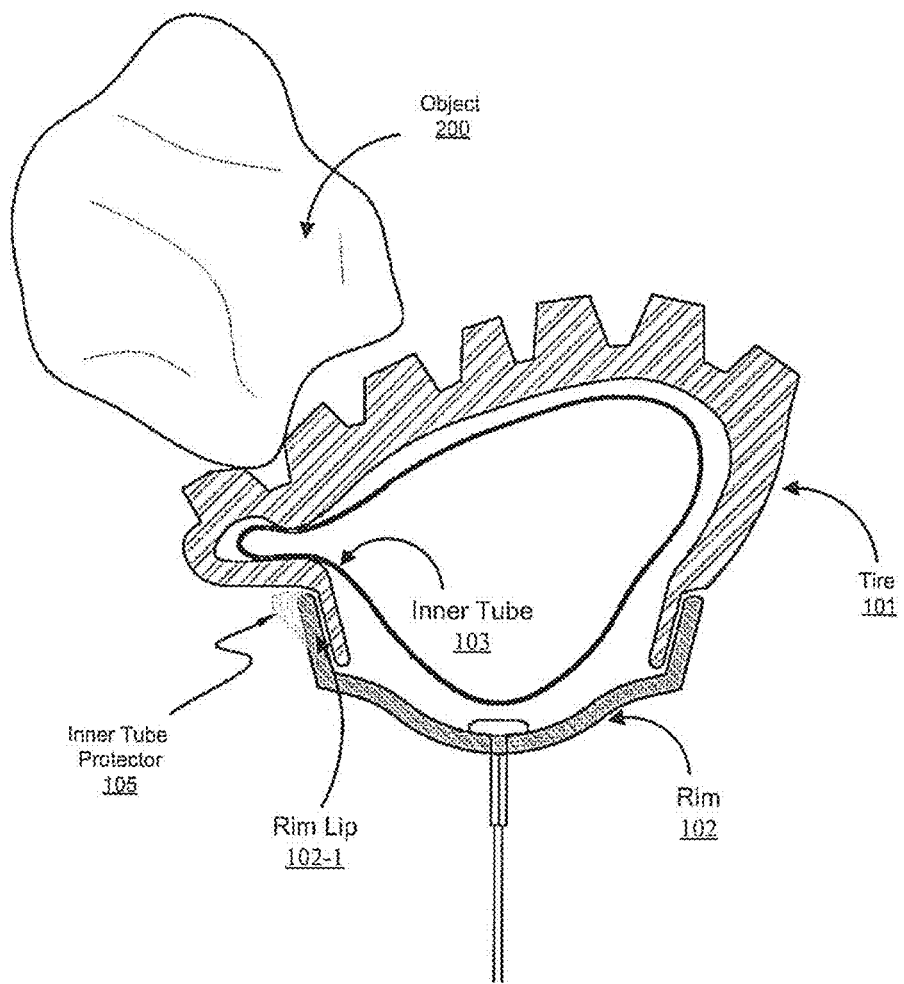
FIG. 10 depicts an exemplary use case of an inner tube protector integrated within a rim in accordance with embodiments of the present invention.

With reference to the embodiment depicted FIG. 10, object 200 may impacts tire 101 with such a high degree of force that it has the potential to cause rim lip 102-1 to generate a pinch flat within inner tube 103. However, as illustrated in FIG. 10, inner tube 103 may suffer no damage as a result of the impact. As illustrated in FIG. 10, the position of inner tube protector 105 with respect to rim lip 102-1 may enable it to dull any contact made by the sharp edges of rim lip 102-1 with tire 101 and thereby protect inner tube 103. As such, inner tube protector 105 may help lower the possibility of inner tube 103 receiving a puncture as a result of object 200 striking tire 101.

Furthermore, according to one embodiment, during the manufacture of an inner tube (e.g., inner tube 103), inner tube protector 104 may be integrated within a pre-determined, fixed location within inner tube 103 so as to maximize the protective capabilities of inner tube protector 104 during operation of a tire assembly utilizing the inner tube.

Although the embodiments described herein depict tire assemblies (e.g., tire assembly 100) that include a tire (e.g., tire 101), a rim (e.g., rim 102), and/or an inner tube (e.g., inner tube 103), embodiments of the present invention are not limited to such configurations and may include more or less components within tire assemblies. For instance, in one embodiment, a tire assembly may additional include protective rim locks or rim guards that may be aligned and function in a co-operational manner with inner tube protector 104.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. Many modifications and variations of the present disclosure are possible in light of the above teachings. It is intended that the scope of the invention be defined by the Claims appended hereto and their equivalents.

What is claimed is:

1. A tire for protecting an inner tube comprising:
   a tread portion circumferentially located about an axis of said tire;
   a tire bead, wherein said tire bead is coupled to said tread portion by a sidewall and adapted to connect a rim on a wheel; and
   a solid, generally circular flat member integrated into said sidewall and adjacent to said tire bead, said flat member, comprising:
      an inner region adapted to support an inner tube installed within said sidewall; and
      an outer region adapted to extend radially outward from said tire bead to provide protection to said inner tube responsive to said wheel striking an object, said outer region adapted to be positioned between a rim lip of said rim and said inner tube to dull an edge of said rim lip, wherein said generally circular flat member comprises a first end and a second end, wherein said first and second ends are symmetrically tapered to form a first rounded edge for said first end and a second rounded edge for said second end, wherein said generally circular flat member comprises a curved cross-section conforming to an interior surface of a tire.

2. A tire as described in claim 1, wherein said outer region protects said inner tube against pinch flats.

3. A tire as described in claim 1, wherein said generally circular flat member comprises a flexible and resilient resin material.

* * * * *